Patented Jan. 2, 1934

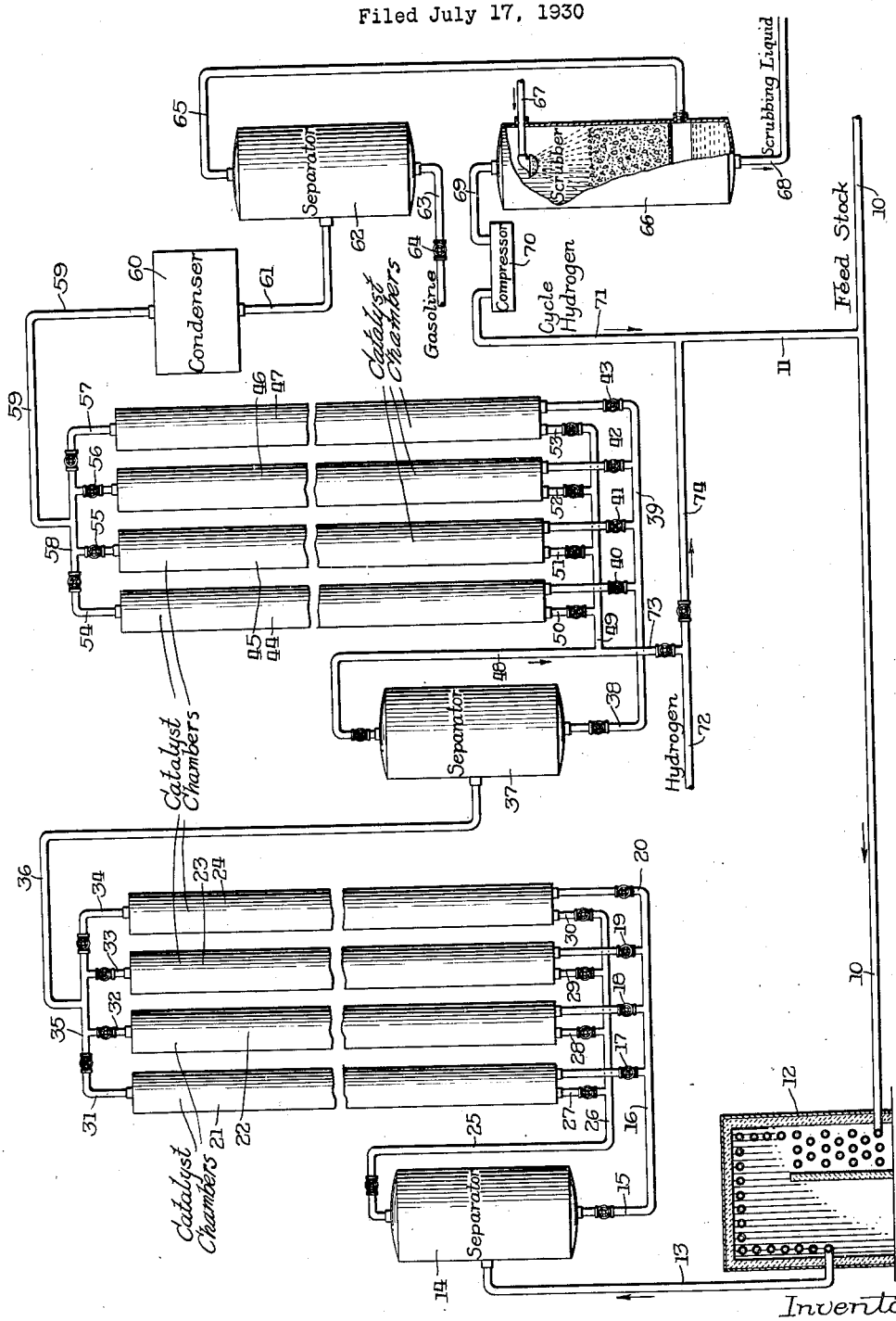

1,942,120

UNITED STATES PATENT OFFICE 1,942,120

HYDROGENATION SYSTEM

William B. Plummer, Chicago, Ill., assignor to Standard Oil Company, Chicago, Ill., a corporation of Indiana Application July 17, 1930. Serial No. 468,589

5 Claims. (Cl. 196—53)

This invention relates to a catalyst system and it pertains more particularly to a system for converting low grade petroleum oils into valuable products, such as gasoline or lubricating oils.

The object of my invention is to provide an improved method and apparatus for the hydrogenation of petroleum oils. A further object is to provide apparatus which will give a better and more uniform distribution of oil and hydrogen. A further object is to provide a flexible system so that one or more catalyst chambers may be cut out of the system. A further object is to produce a more uniform product. A further object is to provide an improved catalyst chamber which can be fabricated at less cost and which will withstand higher pressures than chambers heretofore used. Other objects will be apparent from the following detailed description.

In practicing my invention I may heat a mixture of hydrogen and oil to a temperature of about 850° F. at a pressure of about 150-300 atmospheres, separate the hot gases from the hot liquids, and distribute these separated gases and liquids in a plurality of long catalyst chambers or tubes. The gases and liquids leaving these tubes may again be separated and distributed in a second unit of catalyst tubes, etc. Finally, the liquefiable products are condensed and separated and the hydrogen is scrubbed and returned to the system. A feature of my invention is the use of tubes about 30-40 ft. long, having a diameter of about 12". I have discovered that these tubes may be manufactured more economically than larger vessels, that they can be made to withstand much higher pressures, and that they are more desirable than smaller tubes or larger chambers since improved contact between the materials under treatment and the catalyst mass is obtained and insured.

The invention will be more clearly understood from the following description and from the accompanying drawing wherein I have shown a diagrammatic elevation of my improved system.

The feed stock, which may be any low grade petroleum oil such as gas oil, reduced crude, naphtha bottoms, pressure tar distillate, etc., is introduced at a pressure of about 150-300 atmospheres in pipe 10 mixed with hydrogen from pipe 11 and heated in pipe still 12 to a temperature of about 850° F. The hot mixture of gases and liquids is discharged by pipe 13 into separator 14 wherein the hydrogen and vaporized hydrocarbons are separated from the liquid products. The liquids from the separator are conducted by pipe 15 to header 16, from which they are discharged through valved pipes 17, 18, 19 and 20 into catalyst tubes 21, 22, 23 and 24.

These catalyst tubes are preferably about 12" in inside diameter although they may vary from 6" to 18", and they are preferably about 30-40' long. The manufacturing costs and the mechanical difficulties in the fabrication of catalyst tubes or chambers increases very rapidly with increased diameters. Furthermore, by using catalyst tubes of the dimensions specified I am enabled to shrink a strong, thick walled tube over a resistant metal or alloy lining, which would be impossible with tubes of large diameter. In the process in making these tubes I may go to another art and employ the methods used in the manufacture of gun barrels.

Gases from separator 14 may be conducted through valved pipe 25 to header 26 from which they may be distributed in the catalyst tubes by means of pipes 27, 28, 29 and 30. The primary purpose of separator 14 and of the distributing valves 17, 18, 19, 20, 27, 28, 29 and 30 is to insure balanced and uniform distribution of gases, vapors, and liquids to chambers 21, 22, 23, 24. They also, however, permit the temporary elimination of one or more of the chambers 21, 22, 23, 24 from the system. If the operating temperatures and pressures in the system are such that the materials leaving heater 12 through pipe 13 are essentially entirely in the vapor state it is evident that the separator 14 ceases to function as such, although the system of valved distributor pipes is still necessary to insure uniform distribution between the catalyst tubes 21, 22, 23 and 24.

Gases and liquids leave the top of the catalyst tubes of the first unit through pipes 31, 32, 33, and 34, which lead to a header 35, and these products are then conducted by pipe 36 to a second separator 37.

In all of this equipment I propose to use efficient insulating means, suitable valves, and high pressure connections capable of withstanding the hydrogenation pressures and temperatures. If the temperature is appreciably reduced in the first unit of catalyst tubes, I may pass the liquids and gases from pipe 36 to a second heater before introducing them into separator 37.

The liquids from separator 37 are withdrawn through pipe 38 and distributed by header 39 into pipes 40, 41, 42, and 43, which lead to catalyst tubes 44, 45, 46, and 47. Gases from the separator are conducted by pipe 48 to header 49 and thence through pipes 50, 51, 52, and 53 to the respective catalyst tubes. The gases and liquids leave the catalyst tubes through pipes 54, 55, 56 and 57, which lead into header 58, and from this header they are conducted by pipe 59 into condenser 60 wherein the condensible products are liquefied.

The liquefied products and gases are then conducted by pipe 61 to separator 62, the liquids being withdrawn from the base of the separator through pipe 63 and reducing valve 64, and the gases being withdrawn from the top of the separator through pipe 65. The gases are then introduced into the base of scrubber 66 wherein cold oil introduced by pipe 67 is sprayed countercurrent to the gas and is finally removed through pipe 68. The scrubbed hydrogen leaves the top of the scrubber by pipe 69, is boosted in compressor 70 to the pressure of incoming feed stock and is introduced into said feed stock through pipes 71 and 11. Make-up hydrogen at pressures of from 150–300 atmospheres is introduced by pipe 72. It may be introduced by pipe 73 into manifold 49 for increasing the hydrogen concentration in the last stage of the process and/or it may be introduced by pipe 74 into the stream of hydrogen which is being recirculated. Separator 37 may also function as a point for the introduction of further charging stock, preferably preheated, and ordinarily of such character as to require less destructive hydrogentative treatment (than the initial charging stock introduced at 10) in order to convert it into final products of equal value. Similarly if the initial charging stock be of a character especially difficult to hydrogenate, I may remove a part of the separated heavy liquids from 37 and recycle them by a suitable booster pump to pipe 10 or pipe 13.

The operation of my invention will be obvious from the above description. Details of operating conditions will depend upon the charging stocks employed and the end products desired; these conditions per se form no part of my present invention and will not be described in detail. The catalyst which I employ may be a mixture of molybdenum and chromium oxides or any other metal compound which is used for this purpose. The catalyst is preferably incorporated on a carrier and the tubes are loosely packed therewith. It should be particularly noted that by employing my improved system I obtain uniform distribution of gases and liquids and improved contact between them throughout the several tubes of each unit. Furthermore, any tube may be cut out of the system without interfering with the function of the remaining tubes. The system is thus quite flexible and easily controlled. Furthermore, individual catalyst tubes can be used which are stronger and at the same time cheaper than those heretofore employed.

While I have described a preferred embodiment of my invention it is understood that I do not limit myself to the details therein set forth except as defined by the following claims. Where the term "destructive hydrogenation" is used in the following claims it should be understood to refer to processes wherein heavy or middle oils are converted into oils of lower boiling point by treatment with hydrogen in the presence of catalysts at pressures of more than 100 atmospheres and temperatures of more than 800° F.

I claim:

1. Apparatus for destructive hydrogenation of petroleum oils comprising a heating zone, a separator in continuous communication therewith wherein hot liquids and vapors are separated, a plurality of elongated catalyst chambers arranged for parallel flow, means for separately controlled flow of both liquid and vapor to each of said chambers comprising separate inlets to each chamber for the hot liquid and hot vapor from the separator, means for withdrawing products from the catalyst chambers, and means for cooling and recovering the same.

2. Apparatus according to claim 1 in which several groups of the catalyst chambers arranged for parallel flow are connected in series, a separator for liquid and vapor being provided between each group.

3. Apparatus for continuous destructive hydrogenation of petroleum oils comprising means for heating a mixture of oil and hydrogen in continuous flow therethrough, means for separating said heated mixture into liquid and vapor, a plurality of catalyst chambers arranged for parallel flow, means for separately controlled flow of said separated liquid and vapor concurrently to each of said chambers, means for withdrawing resulting products from each catalyst chamber and means, for cooling and recovering said products.

4. The apparatus according to claim 3 comprising flow controlled means for withdrawing said products separately from each of said catalyst chambers whereby any one of said chambers may be discontinued from service.

5. Apparatus according to claim 3 comprising at least one additional plurality of catalyst chambers arranged for parallel flow, means for separating the products from each of said pluralities of chambers except the last into liquid and vapor, and means for separately controlled flow of said separated liquid and vaporous products concurrently to each chamber of said subsequent plurality of chambers.

WILLIAM B. PLUMMER.